United States Patent [19]
Bondurant et al.

[11] Patent Number: 4,769,072
[45] Date of Patent: Sep. 6, 1988

[54] METHOD AND MEANS FOR INDICATING THE CONDITION OF A UNIVERSAL FOUNTAIN SOLUTION FOR PLANOGRAPHIC PRINTING

[75] Inventors: Louis E. Bondurant, Springbrook Farm, P.O. Box 2074, Middleburg, Va. 21117; Francis R. Bordeaux, Sutter Creek, Calif.

[73] Assignee: Louis E. Bondurant, Middleburg, Va.

[21] Appl. No.: 788,032

[22] Filed: Oct. 16, 1985

[51] Int. Cl.$^4$ .............................................. C09D 5/20
[52] U.S. Cl. .......................................... 106/2; 106/27; 101/451
[58] Field of Search .......................... 106/21, 2, 20, 27; 252/408.1; 101/451

[56] References Cited

U.S. PATENT DOCUMENTS 3,398,002 8/1968 Bondurant et al. ..................... 106/2
3,463,735 8/1969 Stonebraker et al. .............. 252/139
4,441,928 4/1984 Iijima .................................... 106/22
4,560,410 12/1985 Burns et al. ..................... 101/451 X
4,641,579 2/1987 Bernstein ............................... 106/2

*Primary Examiner*—Josephine Barr
*Attorney, Agent, or Firm*—Raymond N. Baker

[57] ABSTRACT

For monitoring the condition of a universal fountain solution for planographic printing, a concentrated universal fountain solution is premixed with a color-change indicator material of predetermined characteristics such as lichen blue. The concentrated fountain solution is provided at a pH above about 3.5 and below about 4.5; the diluted fountain solution is formed by diluting such concentrated solution with water. The contamination occurring during planographic printing which is detrimental to fountain solution effectiveness and printing quality causes the pH of such diluted solution to increase. The indicator material provided initiates a change in color of the diluted fountain solution at a pH when the solution is beginning to lose effectiveness and provides an intense color change as pH increases to a level indicating that the solution should be changed in order to avoid deterioration in the desired quality of printing.

9 Claims, 1 Drawing Sheet

Figure 1:
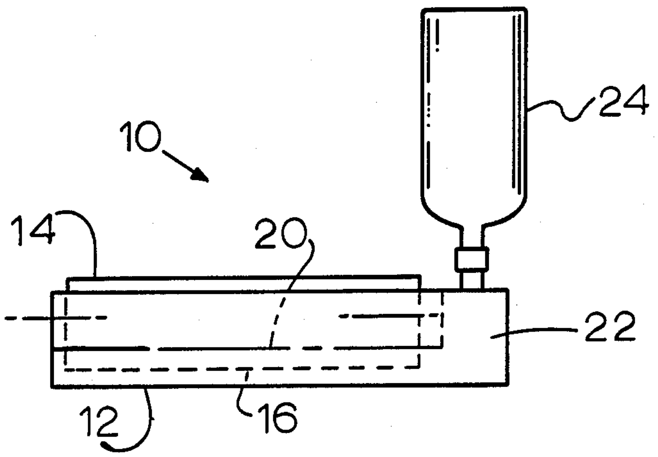

METHOD AND MEANS FOR INDICATING THE CONDITION OF A UNIVERSAL FOUNTAIN SOLUTION FOR PLANOGRAPHIC PRINTING

This invention relates to universal fountain solutions for planographic and offset printing; more particularly, this invention is concerned with a unique universal fountain solution for, and a method of, determining prior to undesirable deterioration of printing quality when universal fountain solution being used has become contaminated and should be replaced.

A universal fountain solution is one which is applicable to virtually all types of planographic printing plates. There are several basic types of printing plates used in planographic printing; these include the "photodirect" plate which requires processing with an etchant prior to printing, the "metal plate" and the "direct image" type; the latter being sometimes referred to as a "stencil" plate since it is prepared by typing or drawing directly on the plate which is usually made with a paper or plastic base.

A common characteristic of all these plates is that the image is oleophilic in that it attracts oily or greasy substances and is essentially water repellant. The image background portion of the plate is hydrophilic to the extent that it can readily be wetted by water but it can also, before being wetted, accept and hold an oily-greasy image. It is therefore necessary to maintain a hydrophilic-oleophilic balance so that the greasy image can be applied to the surface of the plate and the background area can be wetted. The surface so prepared is treated with an etchant which conditions the surface for printing. The etchant can cover only the nonimage area leaving only the image area ink receptive.

During printing, the nonimage area is maintained moistened by the fountain solution so that only the oleographic image area attracts the ink.

A widely used universal fountain solution is that of U.S. Pat. No. 3,398,002; such universal fountain solution can be used to prepare a planographic plate for printing as well as to maintain the plate properly moist during printing.

Fountain solutions lose effectiveness during planographic printing. Evaporation of volatile constituents, bacterial growth and absorption of ambient contaminants cause deterioration. Some contamination can also be caused by the water used for dilution, by the inks used for printing, and by certain papers used in printing. Loss of effectiveness of the fountain solution can go unnoticed because of inattentiveness or inexperience on the part of the press operator causing the quality of the printing to deteriorate. If not noticed promptly in a high speed press, thousands of poor quality prints can be run which must be discarded.

In accordance with the invention, applicants have discovered a commercially practicable method for maintaining the effectiveness of universal fountain solutions. It has been found that the effect of contamination, which results in deterioration of printing quality, manifests itself as an increase in the pH of the universal fountain solution and, provision is made for monitoring pH and maintaining desired quality printing.

The universal fountain solutions of U.S. Pat. No. 3,398,002 should be placed in use at a pH above 3.5 to about 4.5. Increases in the pH of these solutions above 5.5 initiates loss of solution effectiveness. At a pH of about six (6) and approaching 6.5, there is a noticeable deterioration in the quality of the printing such that the solution should be replaced.

The invention teaches monitoring the pH of the fountain solution so as to be able to control the solution and avoid the loss of printing effectiveness. While monitoring for pH values could be carried out electrically, there are practical difficulties in the expense and with reliability of such equipment in the environment of a printing room.

The invention enables the condition and effectiveness of a universal fountain solution to be readily and reliably determined by color change. The universal fountain solution is prepared with an indicator of predetermined characteristics which produces an observable color change when the solution pH increases to a value at which the solution is beginning to lose its effectiveness, which color change intensifies as the pH level increases to a leval causing deterioration in printing quality. As a result, the operator is warned to replace the solution when the color of the solution changes in a predetermined manner. Since the fountain in most printing presses is at least partly open and, since a fountain reservoir bottle with fresh solution is usually transluscent or transparent, a comparative change of color in the fountain solution being used is readily apparent to an operator.

In practice of the invention, the indicator is premixed with universal fountain solutions of the formulations of U.S. Pat. No. 3,398,002 which are representative and widely used. Such fountain solutions are supplied to the printing establishment in a concentrated form and require only the addition of water for use in the fountain.

Fountain formulations are, however, complex chemically and the indicator means selected to be premixed with the concentrated solution should not react with or affect the normal shelf life expected of concentrated universal fountain solutions. The indicator is selected to provide an observable color change when the solution is beginning to lose effectiveness and an intensified color change at pHs above which the desired printing quality cannot be maintained; also, the color change properties must be reliably provided over the normal useful life of the solution.

In accordance with the invention, a preferred indicator material which can be premixed with concentrated fountain solutions is lichen blue.

Lichen blue is premixed with the concentrated fountain solutions of the universal type described by U.S. Pat. No. 3,398,002 in an amount which can extend over the range of 0.001% to 3% by weight of the concentrated fountain solutions. The concentrated solution is provided with a pH value of about four (4). Such solution has a red color in the concentrated form and after proper dilution for use.

A color change from red toward purple is initiated and observable as the pH of the diluted solution increases above about 5.5, with the color change intensifying to deeper shades of purple when the pH increases above about six (6) toward 6.5. This color change from red to purple initiating at pH values above 5.5 enables monitoring of the condition of the solution.

Lichen blue has been found to be the most practical indicator material of those available to monitor for the pH changes taught by the invention. While it may be possible to mix other color change indicator materials, such as methyl purple, with the solution at the time it is diluted in an attempt to minimize problems of relialability and stability, such mixing of an indicator material at the time of use presents additional problems. In brief, the characteristics of lichen blue qualify it as the preferred indicator material of the present invention.

Objects of the invention are to provide a unique universal fountain solution and method of indicating by color change when the fountain solution has deteriorated and should be changed.

Another more specific object of the invention is to provide a universal fountain solution in which the color indicator is premixed with concentrated fountain solution, does not affect the concentrated solution or the characteristics of the diluted solution used in the fountain, and which is stable and reliable for indicating solution effectiveness.

A specific object of the invention is to provide a universal fountain solution in which the color indicator premixed with the concentrated universal fountain solution is lichen blue.

Figure 2:
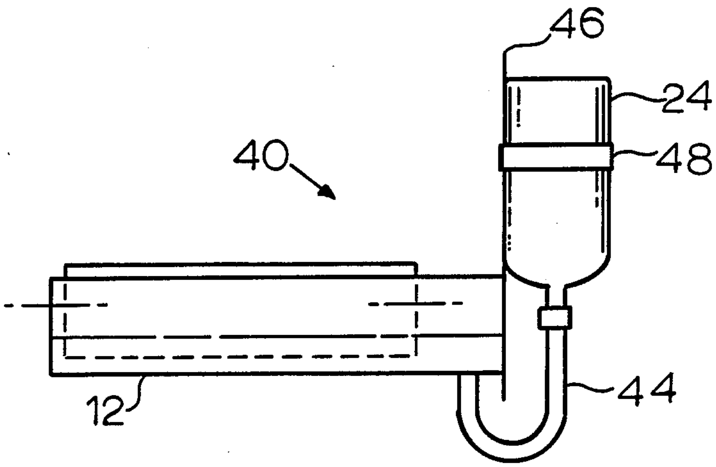

Other aspects, contributions and advantages of the invention will be considered in a more detailed description of the invention presented in relation to the accompanying drawings, in which:

FIG. 1 is a schematic front view in elevation of a fountain solution arrangement for carrying out the invention, and FIG. 2 is a schematic front elevational view showing another embodiment of a fountain solution arrangement for carrying out the invention.

Fountain arrangement 10 of FIG. 1 presents an open-top tray 12 and a horizontal transfer roller 14 which extends into the tray. The low point of periphery 16 of the roller 14 is very close to the bottom of the tray and dips into the fountain solution 20 within the tray.

During printing, the roller 14 revolves so its surface is wetted and the fountain solution is transferred by one or more moistening or applicator rollers (not shown), one of which rolls against the surface of a printing plate to maintain the background area of the printing plate moistened with the fountain solution. An ink roller also rolls against the surface of the printing plate to maintain the image of the plate inked. Since the ink roller and the moistening roller both contact such plate cylinder, contaminants from the ink can be picked up by the moistening roller and transferred to the fountain solution in the tray 12; and, the fountain solution being used is otherwise exposed to contamination.

The fountain solution is fed to the tray from a receiving section 22 of the tray 12 which is in turn supplied with fountain solution by a reservoir bottle 24 mounted adjacent to or directly on the fountain reservoir section 22. The reservoir bottle 24 feeds fountain solution as required. The solution in the section 22 is in constant liquid communication with the fountain solution being used in the tray 12. The reservoir bottle 24 is conventionally transluscent or transparent, for observing the level of the solution in the bottle, so that comparative color observation of exposed solution to fresh solution is readily available.

The fountain arrangement 40 of FIG. 2 differs only slightly from that of FIG. 1 in that the reservoir bottle 24 is connected to the tray reservoir section 22 by a transparent tube 44, in which fountain solution can be observed. The reservoir bottle 24 of FIG. 2 is supported by a bracket 46 and ring clamp 48 which encircles the bottle.

The fountain arrangements of FIGS. 1 and 2 are exemplary and illustrate how the fountain solution is observed. The solution in the fountain tray 12 is readily observable from above in most presses and exposed solution is also observable on applicator rolls (not shown).

As taught herein, the condition and effectiveness of a universal fountain solution can be determined by observing its color so that the fountain solution can be replaced before the quality of the printing deteriorates undesirably. Other arrangements than those described above can be provided for observing the color change of the universal fountain solution during its usage.

The formulation of the invention is based upon an aqueous solution of a monobasic alkali metal phosphate; alcohol; an humectant selected from the group comprising glycerin, propylene glycol, and sorbitol; a substance selected from the group comprising "butyl Cellosolve", "butyl Carbitol", and "Jeffersol EB" (all trade names for ethylene glycol monobutyl ether) and contains between 0.001% and about 0.3%, preferably 0.1% to 0.5%, by weight lichen blue which is commercially available as litmus powder. A trace amount of phosphoric acid may be added to adjust the pH of the concentrated solution to be above about 3.5 and below about 4.5.

A preferred formula for a stock solution which may be diluted 1:7 with water for use with various standard types of planographic printing plates (such as referred to above) is given in the following exaxple, in which all parts are in terms of percent by weight:

EXAMPLE 1

| | Percent |
|---|---|
| Lichen blue | 0.1 |
| Monopotassium phosphate [$KH_2PO_4$] | 2 |
| Isopropyl alcohol [$CH_3CH(OH)CH_3$] | 7 |
| Glycerin $CH_2OHCHOHCH_2OH$ | 12 |
| Ethylene glycol monobutyl ether (butyl "Cellosolve" or 2-butoxyethanol) [$CH_3CH_2CH_2CH_2OCH_2CH_2OH$] | 8 |
| Balance deionized water. | |

In preparing the solution set forth in the foregoing Example 1, it is preferred that the monopotassium phosphate be added to the deionized water first and thoroughly mixed therein, after which the remaining liquid ingredients are added and thoroughly mixed therewith. The lichen blue is added last and is well mixed with the solution. The resulting solution after mixing had a distinctive red color which is observable through a transluscent container.

The solution of Example 1 constitutes a stock solution which is further diluted in the ratio of one part of said solution to seven parts water, preferably deionized, prior to use in the fountain of the press. This solution is a preferred formulation considering both cost and performance; the stability of the solution and the quality of the printing are not deteriorated by the presence of the lichen blue indicator material.

With use, the color of the fountain solution changes from red to purple as a result of contamination and exposure of the solution. Initiation of a color change at a pH of 5.5 and a distinctly observable purple as the pH exceeds six (6) indicates that replacement of fountain solution should be undertaken in order to maintain a desired quality of printing.

In relation to the ranges of operable concentrations of the solution components, Example 2 shows the low limit concentrations; as in the foregoing example, all percentages are by weight.

EXAMPLE 2

| | Percent |
|---|---|
| Lichen blue | .001 |
| Monopotassium phosphate [$KH_2PO_4$] | 0.1 |
| Isopropyl alcohol [$CH_3CH(OH)CH_3$] | 1 |
| Glycerin $CH_2OHCHOHCH_2OH$ | 2 |
| Ethylene glycol monobutyl ether (butyl "Cellosolve" or 2-butoxyethanol) [$CH_3CH_2CH_2CH_2OCH_2CH_2OH$] | 1 |
| Balance deionized water. | |

Both the concentrated stock solution and the diluted use solution of Example 2 have a slightly paler red color than that of Example 1.

The percentage of each of the components can vary in the range of:

| | Percent |
|---|---|
| Lichen blue | .001-3 |
| Monopotassium phosphate [$KH_2PO_4$] | .01-10 |
| Isopropyl alcohol [$CH_3CH(OH)CH_3$] | 1-25 |
| Glycerin $CH_2OHCHOHCH_2OH$ | 2-30 |
| Ethylene glycol monobutyl ether (butyl "Cellosolve" or 2-butoxyethanol) [$CH_3CH_2CH_2CH_2OCH_2CH_2OH$] | 2-12 |
| Balance deionized water. | |

Both the concentrated stock solution and the diluted use solution have a red color which changes to a distinct purple with lichen blue in the range of about 0.1% to 0.5% by weight. Increasing concentrations of lichen blue in the stock solution above about 3% can add significantly to cost without adding correspondingly to effectiveness in carrying out the invention.

As disclosed in U.S. Pat. No. 3,398,002, which is included herein by reference, the maximum amount of monopotassium phosphate used will be dependent upon the amount of nonaqueous materials in the solution; also, the exemplary formulations are not limited to monopotassium phosphate since other buffers such as monoammonium phosphate or monosodium phosphate may be substituted. The buffer helps to maintain the desired pH of the fountain solution. As stated previously, trace amounts of phosphoric acid may be used to adjust the pH of the concentrated solution.

Also, as disclosed in U.S. Pat. No. 3,398,002, alcohol such as ethyl and n-propyl may be substituted for isopropyl alcohol; other polyhydric alcohols may be substituted for glycerin. Variations may also be made in the range of dilution of the stock solution with water; preferably, the water used does not change the chemistry of the solution or significantly alter the pH value provided.

While specific values have been set forth in describing specific embodiments of the invention, other values or combinations can be selected in the light of the above teachings; therefore, in determining the scope of the present invention, reference should be made to the appended claims.

We claim:

1. A concentrated fountain solution having a pH above about 3.5 and less than about 4.5 which is to be diluted with water for use in the fountain of a planographic printing press, comprising 0.1% to 10% by weight of a monobasic alkali metal phosphate buffer selected from the group consisting of monopotassium phosphate, monoammonium phosphate and monosodium phosphate, all of such buffer being in solution, 1% to 25% by weight of an alcohol selected from the group consisting of ethyl alcohol, isopropyl alcohol and n-propyl alcohol, 2% to 30% by weight of a polyhydric alcohol humectant selected from the group consisting of ethylene glycol, glycerin and propylene glycol, 1% to 25% by weight of ethylene glycol monobutyl ether, a color-change indicator material, and the balance being water, such color-change indicator material being present in such concentrated fountain solution in an amount to indicate by a change of color of the universal fountain solution, which is formed by diluting such concentrated solution with water for planographic printing, when the pH of such diluted fountain solution increases to about six (6) during use in planographic printing, such color-change indicator material exhibiting stability and reliability characteristics such that the normal shelf life of the concentrated fountain solution is unaffected by such color-change indicator material and the desired color-change properties are reliably provided over the normal useful life of such diluted fountain solution.

2. The solution as set forth in claim 1 wherein such color-change indicator material consists essentially of lichen blue.

3. The solution as set forth in claim 2 wherein such lichen blue is present in the concentrated solution in an amount in the range of 0.001% to 3% by weight of such concentrated solution.

4. The solution as set forth in claim 3 wherein such lichen blue is present in the concentrated solution in an amount in the range of about 0.1% to 0.5% by weight of such concentrated solution.

5. The solution as set forth in claim 1 wherein phosphoric acid is added as required to adjust the pH of such concentrated solution to be within such range above about 3.5 and below about 4.5.

6. Method for monitoring the condition of a universal fountain solution for planographic printing for purposes of maintaining the effectiveness of the printing qualities, comprising providing a concentrated universal fountain solution having 0.1% to 10% by weight of a monobasic alkali metal phosphate buffer which is in solution selected from the group consisting of monopotassium phosphate, monoammonium phosphate and monosodium phosphate, 1% to 25% by weight of an alcohol selected from the group consisting of ethyl alcohol, isopropyl alcohol and n-propyl alcohol, 2% to 30% by weight of a polyhydric alcohol humectant selected from the group consisting of ethylene glycol, glycerin and propylene glycol, 1% to 25% by weight of ethylene glycol monobutyl ether, a color-change indicator material, and the balance being water, providing for adjusting the pH of such concentrated solution, if required, to be above about 3.5 and below about 4.5 providing for adding water to such concentrated solution to form a diluted universal fountain solution for use in planographic printing, such color-change indicator material being present in such concentrated solution in an amount sufficient to indicate by change of color, during use of the diluted universal fountain solution for planographic printing, when the pH of such diluted solution increases to about six (6), such color-change indicator material exhibiting stability and reliability characteristics such that the normal shelf life of the concentrated fountain solution is unaffected by such color-change indicator material and the desired color-change properties are reliably provided over the normal useful life of such diluted fountain solution.

7. The method of claim 6 wherein such color change indicator material consists essentially of lichen blue, and such lichen blue is premixed into such concentrated solution to be present in an amount between 0.001% and 3% by weight of such concentrated solution so as to cause a color change in such diluted solution from red to purple when the pH of such diluted solution increases to about six (6).

8. The method of claim 7 wherein such lichen blue is premixed to be present in an amount between 0.1% and 0.5% by weight of such concentrated solution.

9. The method of claim 7, including the steps of adding such diluted solution to fountain means for transfer to a planographic printing roll, the color of such diluted solution from such fountain means being observable as used in planographic printing, providing reservoir supply means for adding diluted fountain solution to such fountain means, such reservoir supply means being located contiguous to such fountain means, and including a reservoir container holding diluted fountain solution for make-up addition of diluted fountain solution to such fountain means as required during planographic printing, such reservoir container having a wall means which is at least color transluscent enabling comparison of the color of such diluted fountain solution for make-up addition to such fountain means with the color of diluted fountain solution which is being used for planographic printing to indicate when such diluted fountain solution being used should be changed in order to avoid undesirable deterioration of planographic printing quality.

* * * * *